United States Patent
McFadyen et al.

(10) Patent No.: US 8,514,518 B2
(45) Date of Patent: Aug. 20, 2013

(54) FLAT E-YOKE FOR CUSP WRITE HEAD

(75) Inventors: Ian Robson McFadyen, San Jose, CA (US); Petrus Antonius Van Der Heijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1156 days.

(21) Appl. No.: 12/114,694

(22) Filed: May 2, 2008

(65) Prior Publication Data

US 2009/0273862 A1 Nov. 5, 2009

(51) Int. Cl.
*G11B 5/10* (2006.01)
*G11B 5/31* (2006.01)

(52) U.S. Cl.
USPC .............. 360/125.3; 360/125.17; 360/125.18; 360/125.29

(58) Field of Classification Search
USPC ............. 360/125.06, 125.07, 125.08, 125.27, 360/125.28, 125.29, 125.3, 125.67, 125.68, 360/125.69, 125.7, 125.71, 125.17, 125.18
See application file for complete search history.

(56) References Cited

U.S. PATENT DOCUMENTS

| 4,725,909 A | 2/1988 | Kawai | 360/126 |
| 6,542,331 B1 * | 4/2003 | Chang et al. | 360/125.41 |
| 6,741,526 B1 | 5/2004 | Fujiie et al. | 369/13.17 |
| 6,798,615 B1 | 9/2004 | Litvinov et al. | 360/125 |
| 6,954,340 B2 * | 10/2005 | Shukh et al. | 360/125.13 |
| 7,019,944 B2 | 3/2006 | Matono et al. | 360/126 |
| 2006/0117556 A1 | 6/2006 | Matono et al. | 29/603.16 |
| 2006/0176601 A1 | 8/2006 | Amin et al. | |
| 2006/0262440 A1 | 11/2006 | Sasaki et al. | 360/1 |
| 2007/0097546 A1 | 5/2007 | Li et al. | 360/125 |
| 2007/0115583 A1 | 5/2007 | Bonhote et al. | 360/126 |
| 2008/0273268 A1 * | 11/2008 | Hsiao et al. | 360/123.12 |

FOREIGN PATENT DOCUMENTS

EP 0025596 3/1981

OTHER PUBLICATIONS

Ise, K. et al., "High-field gradient cusp field single-pole writing head with font return yoke" IEEE Transactions on Magnetics, Sep. 2003, vol. 39, Issue 5, Part 2, pp. 2374-2376, Abstract Only.

* cited by examiner

*Primary Examiner* — Craig A. Renner
(74) *Attorney, Agent, or Firm* — Zilka-Kotab, PC

(57) ABSTRACT

A magnetic write pole structure that is configured to greatly simplify the manufacture of a perpendicular magnetic write head. The write head has a magnetic yoke that is oriented along a plane that is perpendicular to the direction of the data track. This allows the entire yoke to be formed in a single electroplating step, rather than being built up in several plated layers. The yoke can also be formed with magnetic side shields, or with a trailing or wrap around shield, which can be integral with the rest of the yoke and can be advantageously formed in the same, single electroplating step.

6 Claims, 13 Drawing Sheets

FLAT E-YOKE FOR CUSP WRITE HEAD

FIELD OF THE INVENTION

The present invention relates to perpendicular magnetic recording and more particularly to a method for manufacturing a magnetic write head having a tapered, stepped trailing shield structure for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head, having magnetic yoke formed as a single, integral layer formed along a plane that is substantially perpendicular to the data track direction, and that has a magnetic write pole connected with the magnetic yoke.

The yoke can be formed as an "E" shaped yoke having first and second laterally opposed magnetic return poles and a flux guide disposed between the first and second magnetic return poles. The yoke can also be formed to include a magnetic shield that can be formed integral with the yoke, and formed in the same electroplating step as the rest of the yoke. The shield can be in the form of first and second side shields each connected with one of the return poles and extending toward the write pole. The shield could also be a trailing or wrap around magnetic shield that can extend over the trailing edge of the write pole, being separated from the write pole by a non-magnetic gap layer.

Orienting the yoke in a plane that is perpendicular to the data track direction, advantageously allows the write pole (and shield if included) to be formed in a single electroplating step. This greatly reduces the number of manufacturing steps required when compared with prior art designs wherein a yoke was formed in a series of photolithography and plating steps.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
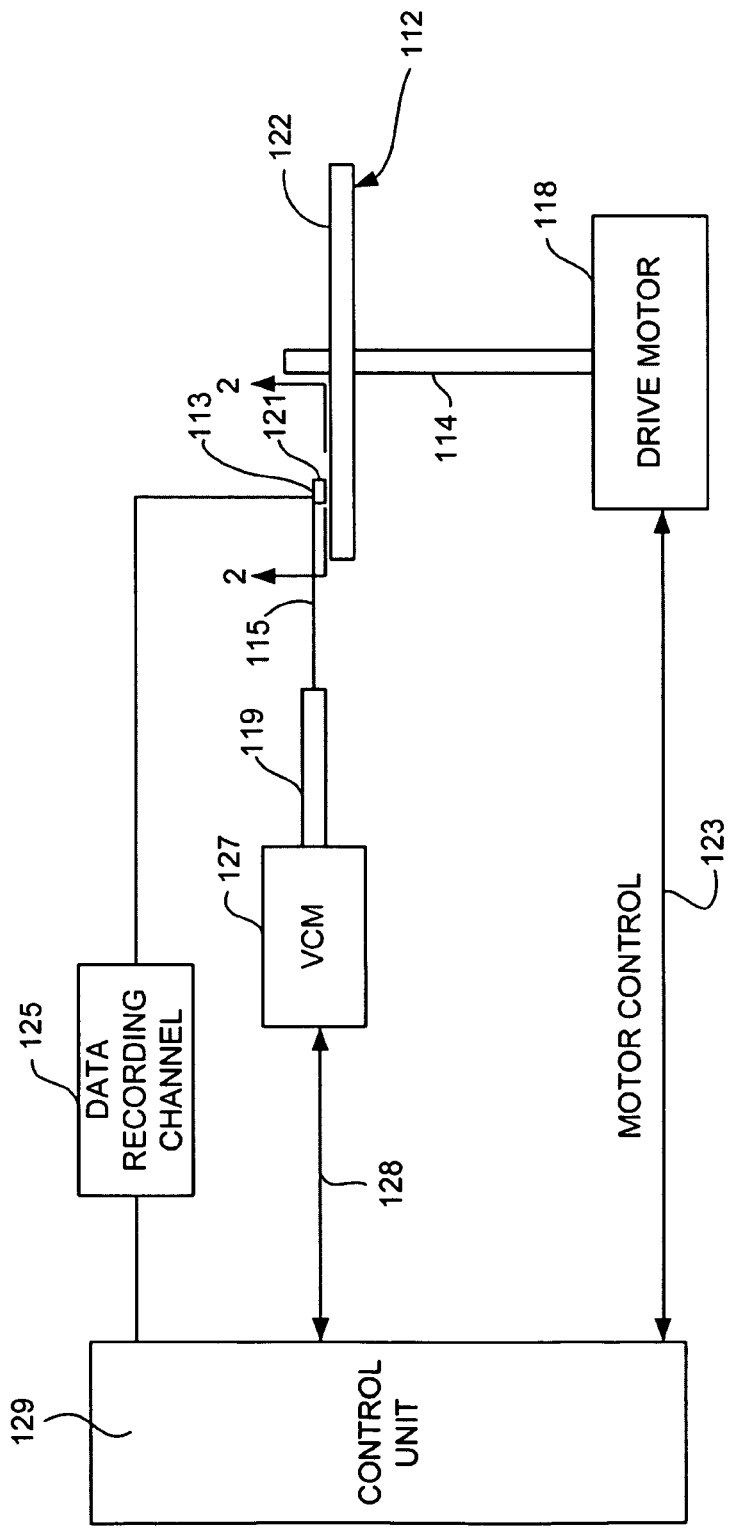
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
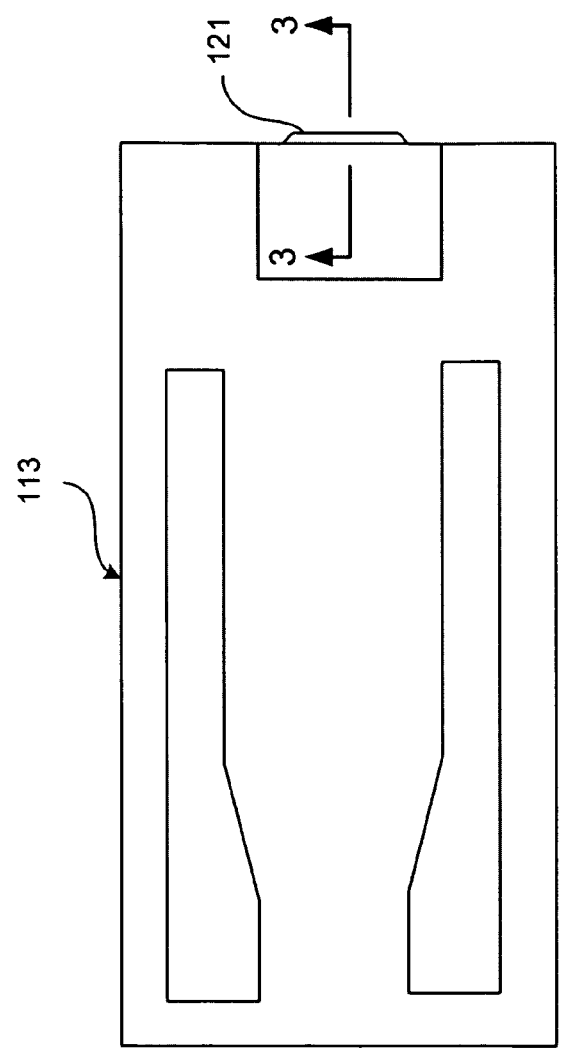
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
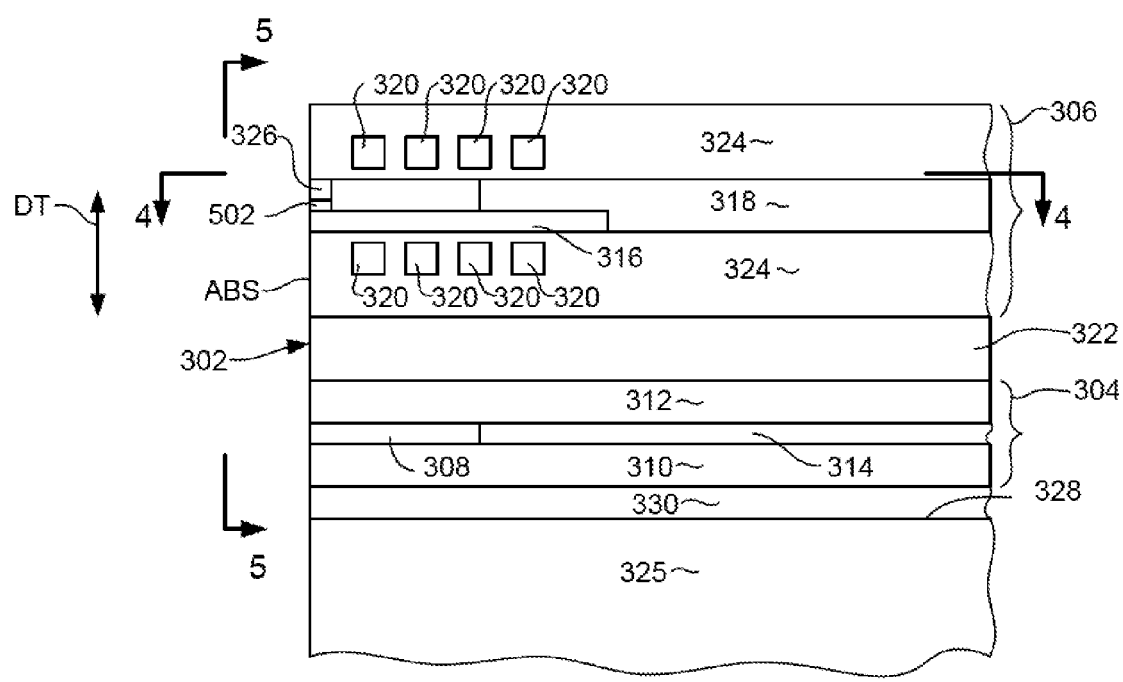
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302, that includes a read head 304, and a write head 306. The read head 304 can include a magnetoresistive sensor 308 sandwiched between first and second lead layers 310, 312 and embedded in an insulation layer 314. The write head 306 includes a magnetic write pole 316 that is magnetically connected with a magnetic yoke 318. The write pole 316 and yoke 318 will be described in greater detail below. An electrically conductive write coil 320 passes above and below the write pole 316 and yoke 318. The write coil can be constructed of an electrically conductive material such as Cu, and can be a helical coil or one or more pancake coils. A magnetic shield 322 is preferably disposed between the write head 306 and read head 304 in order to prevent magnetic field from the write coil 320 from affecting the sensor 308 of the read head 304. The write coil 320 can be embedded in an insulation layer 324 such as alumina. A portion of the magnetic yoke 318 can form a trailing, wrap around magnetic shield 326 that will be described in greater detail herein below. As can be seen in FIG. 3, the head 302 has an air bearing surface ABS that is parallel with a data track direction, the orientation of the data track direction being indicated by arrow DT.

The magnetic head 302 is constructed upon a substrate 325 that is also the body of the slider 113 as shown in FIGS. 1 and 2. The substrate 325 has a surface 328 that is perpendicular to the ABS, and also substantially perpendicular to the direction of the data track DT. This substrate surface 328 is the surface of a wafer on which the magnetic head 302 is constructed. As those skilled in the art will appreciate, a magnetic head is formed on a wafer using various manufacturing processes, such as material deposition, photolithographic processing, and various material removal processes such as reactive ion etching and ion milling. After the magnetic head 302 (read head 304, and write head 306) has been formed on the wafer (substrate 325) the wafer is sliced into rows of sliders. A lapping operation is performed to define the location of the air bearing surface ABS, and a slicing operation is performed to cut the row of sliders into individual sliders. The substrate surface 328, therefore, is the surface of the wafer on which the head 302 has been formed. An insulation layer 330, such as a layer of alumina may be provided between the surface 328 of the substrate and the rest of the head 302.

Figure 4:
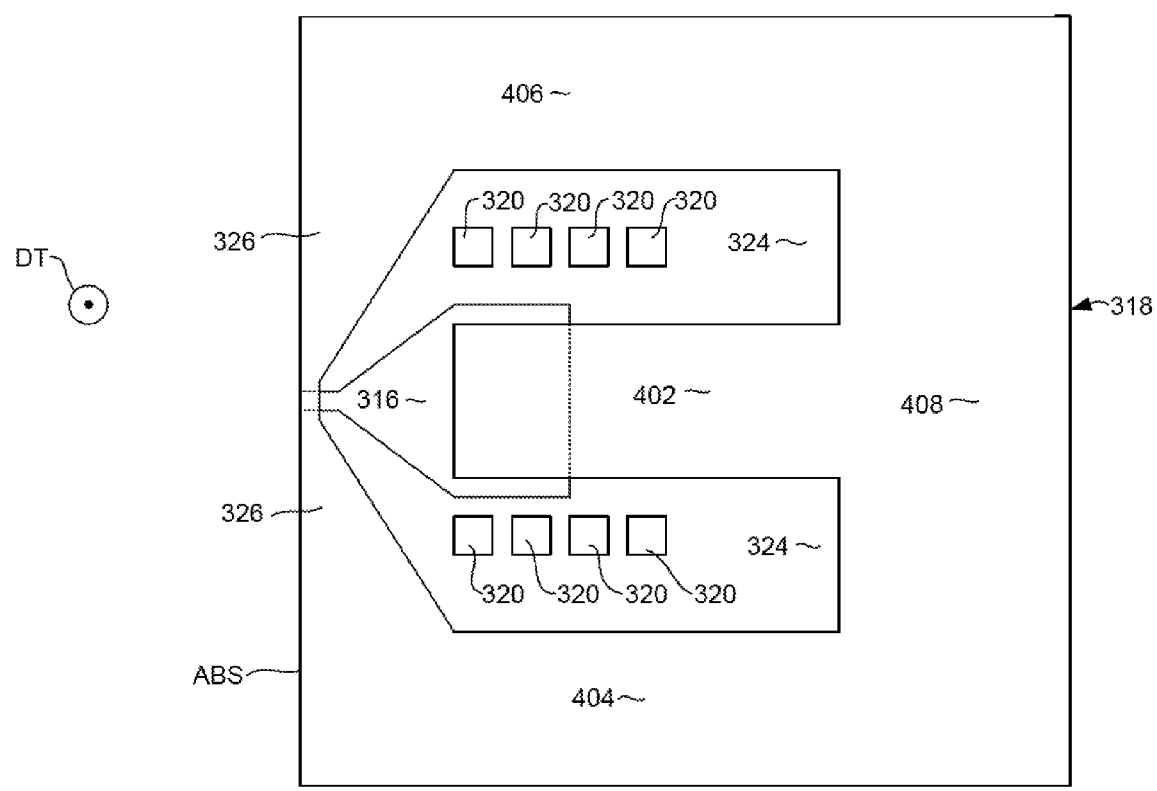
FIG. 4 is a top down sectional view of the write head taken from line 4-4 of FIG. 3.

FIG. 4 shows a top-down, sectional view of the write head as taken from line 4-4 of FIG. 3. As can be seen in FIG. 4, the yoke 318 forms an "E" shape and is oriented so that it is substantially flat, formed in a plane that is substantially perpendicular to the data track direction which is indicated by arrow head symbol DT in FIG. 4. The yoke 318 is also substantially parallel with the surface 328 of the substrate 325, described with reference to FIG. 3). This orientation of the yoke 318 greatly facilitates manufacture by allowing the entire yoke 318 to be formed in a single electroplating process as will become apparent below.

With continued reference to FIG. 4, the "E" shaped yoke 318 has a flux guide portion (also referred to as a shaping layer) 402 that is formed over and connected with the write pole 316, and has first and second laterally opposed return pole portions 404, 406. The laterally opposed return pole portions 404, 406 and flux guide 402 are magnetically connected with one another by a back portion 408 located away from the air bearing surface ABS. Each of the return pole portions 406, 404 can be connected with shield portions 326 that extend toward and over the write pole 316. The entire yoke 318, including the back 408, flux guide 402, return poles 404, 406 and shield 326 can advantageously be formed in a single photolithographic patterning and electroplating step, as will be seen below.

As can be seen, in the presently described embodiment, the yoke 318 is formed over the write pole 316. Portions of the write pole passing beneath the yoke 318 are shown in dotted line in FIG. 4. The write pole can be formed a high moment magnetic material and is preferably constructed as laminations of high moment magnetic material such as CoFe separated by thin layers of non-magnetic material. The yoke 318 can be an electrically conductive, magnetic material such as NiFe or CoFe that can be easily electroplated.

Figure 5:
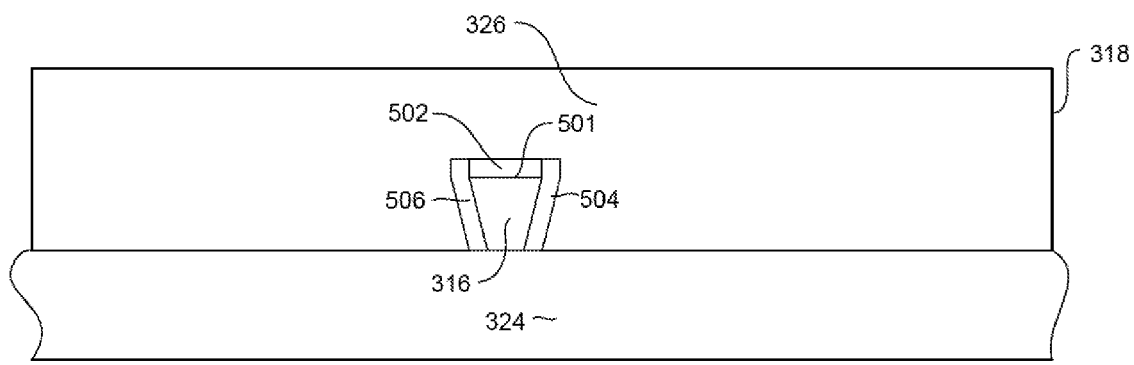
FIG. 5 is an air bearing surface view of the write head taken from line 5-5 of FIG. 3.

FIG. 5 shows an enlarged air bearing surface view of the write head 306. As can be seen with reference to FIGS. 3, 4 and 5, a portion of the yoke extends to the air bearing surface ABS and passes over and wraps around the tip of the write pole 316 to form the trailing, wrap around magnetic shield 326. As can be seen, the tip of the write pole 316 as viewed from the air bearing surface has a trapezoidal shape with a trailing edge 501. The shield 326 wraps around the write pole 316, being separated from the trailing edge 501 by a non-magnetic trailing gap layer 502, and also being separated from the sides of the write pole by non-magnetic side gap layers 504, 506. The trailing gap layer 502 and side gap layers 504, 506 can be formed of the same or different materials.

Figure 6:
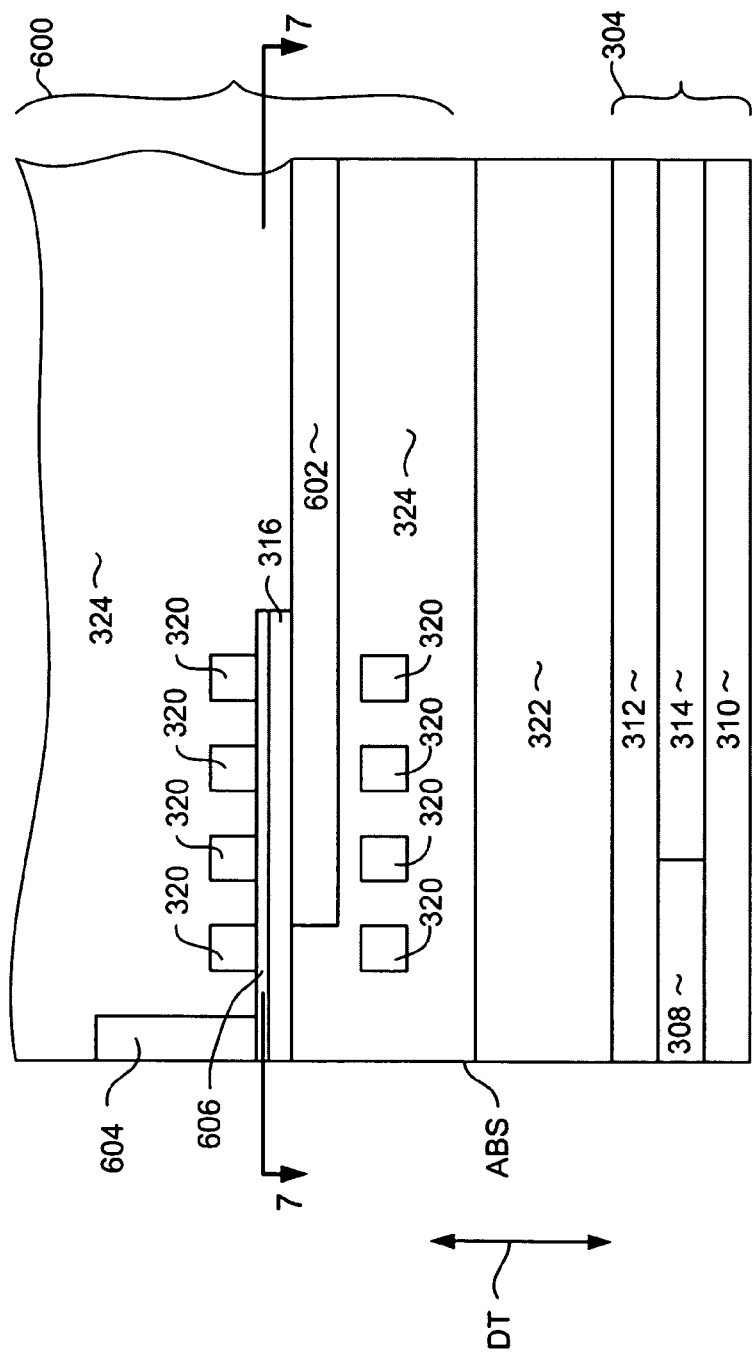
FIG. 6 is a cross sectional view of a magnetic write head of an alternate embodiment of the invention.

The novel flat "E" shape of the yoke 318 advantageously allows the trailing wrap around shield 326 to be formed integral with and in the same electroplating step as the yoke 318. It should be pointed out, however, that this only a possible embodiment of the invention. The yoke 318 can be formed without any trailing, wrap-around 326 or could be formed with side shield, but no trailing shield or could be formed with trailing shield, but no side shields. With or without the trailing wrap around shield 326, the flat orientation of the yoke 318 (formed along a plane that is substantially perpendicular to the data track direction) advantageously facilitates manufacture, by greatly reducing the number of manufacturing steps needed to form the yoke as compared with prior art write head yokes that have been built using many patterning and electroplating steps. With reference to FIG. 6, a trailing magnetic shield 604 can be provided at the air bearing surface and separated from the write pole 316 by a non-magnetic trailing gap 606. The trailing shield 604 and trailing gap 606 could be constructed in manufacturing steps, separate from and after the manufacture of the yoke 602.

Figure 7:
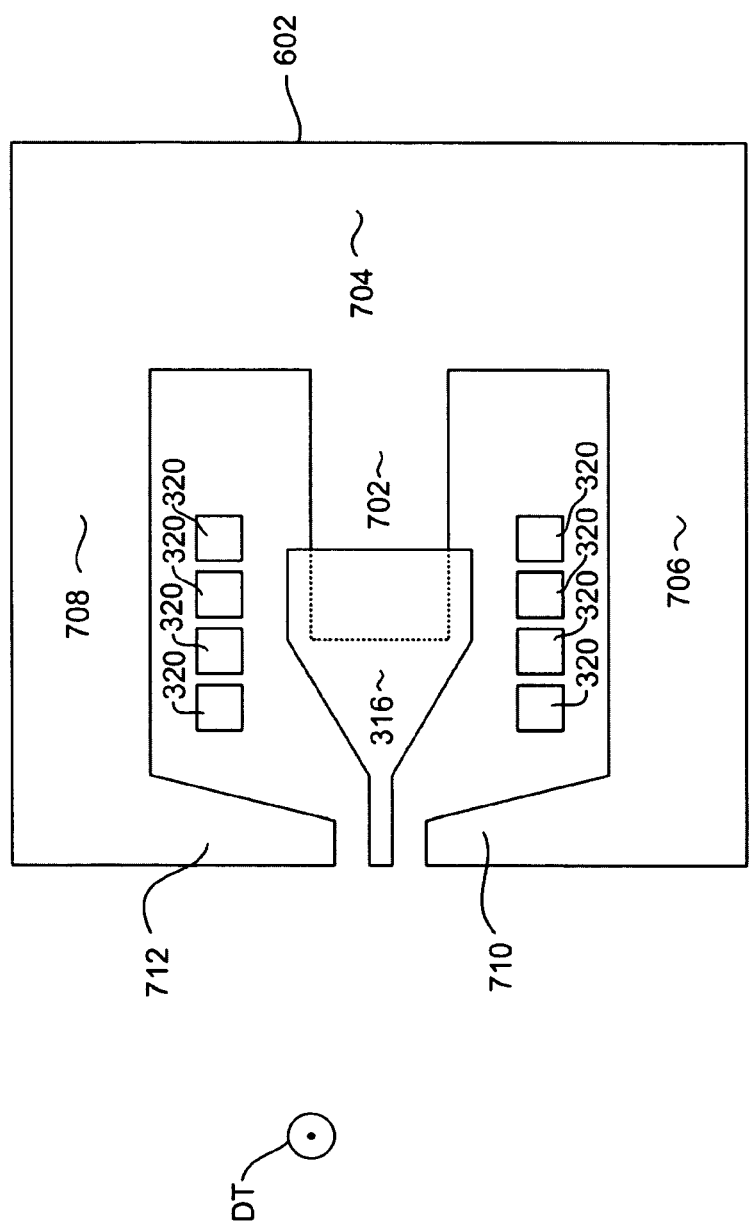
FIG. 7 is a top down sectional view taken from line 7-7 of FIG. 6.

With reference now to FIG. 6, an alternate embodiment of the invention includes a write head 600 wherein the write pole 316 is formed on top of a magnetic yoke 602 (rather than beneath it as was the case in the previously described embodiment). As with the previously described embodiment, the yoke 602 is formed along a plane that is substantially perpendicular to the data track direction DT. With reference to FIG. 7, the yoke 602 has an "E" shape, having a flux guide or shaping layer portion 702, a back portion 704 and first and second laterally opposed return poles 706, 708. The return poles can also be connected with shield portions 710, 712 that extend toward the write pole 316 at the air bearing surface ABS. These side shield portions can be useful in preventing stray flux, such as from the write coil 320 or flux guide, 702, from reaching the adjacent magnetic medium (not shown). Alternatively, the shield portions 712, 710 could pass beneath the write pole 316 to form a leading shield (as opposed to the trailing shield described in FIG. 5).

Figure 8:
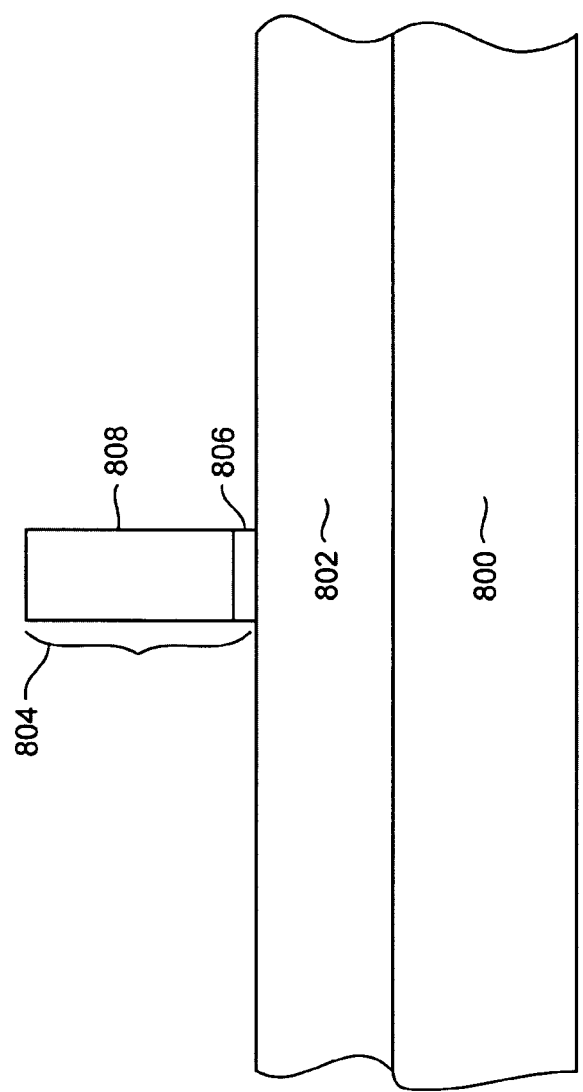
FIGS. 8-13 are views of a write head in various intermediate stages of manufacture illustrating a method of manufacturing a write head according to a possible embodiment of the invention.

With reference now to FIGS. 8-13, an example of a method for manufacturing a write head according to an embodiment of the invention is described, which shows how the present invention greatly simplifies the manufacture of a write head. With particular reference to FIG. 8, a substrate 800 is provided. This substrate 800 can be an alumina insulation layer such as the insulation layer 324 described above with reference to FIG. 3.

A layer of magnetic write pole material 802 is deposited over the substrate. The write pole material 802 can be various materials, but is preferably a lamination of layers of high moment magnetic material such as Co—Fe separated by thin layers of non-magnetic material. Note that the entire structure, including a previously formed read head 304, are formed on a wafer surface that is not shown in FIG. 8, the wafer surface can correspond to the substrate surface 328 described in FIG. 3.

A mask structure 804 is formed over the write pole material 802. The mask structure 804 can include a hard mask layer 806, such as $SiO_2$, diamond like carbon (DLC) or alumina, and photoresist mask layer 808 formed over the hard mask layer 806.

Figure 9:
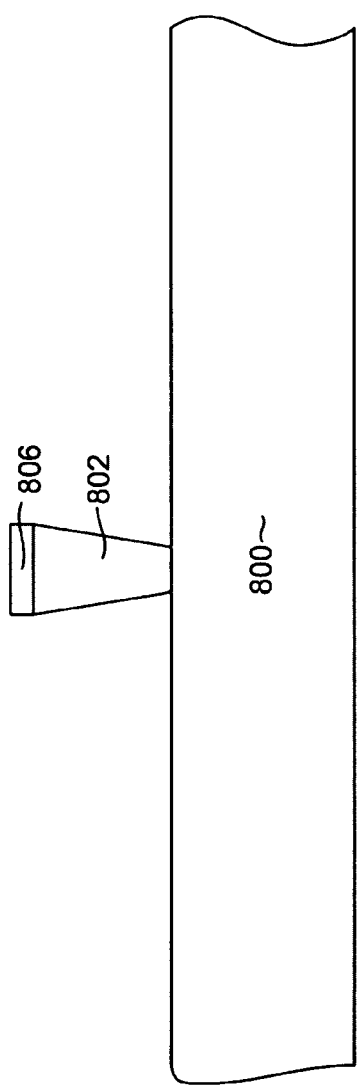

A material removal process such as ion milling is then performed to remove portions of the write pole material 802 that are not protected by the mask 804, resulting in a structure as shown in FIG. 9. The ion milling can be performed at one or more angles relative to normal to form the write pole 802 with a trapezoidal shape as shown. FIG. 9 shows the pole tip portion of the write pole viewed in a plane that is parallel with the air bearing surface. A wider flare portion of the write pole 802 would be formed into the plane of the page. As seen in FIG. 9, the ion milling removes all or a portion of the photoresist mask, and any remaining photoresist mask can be lifted off, leaving just the hard mask 806.

Figure 10:
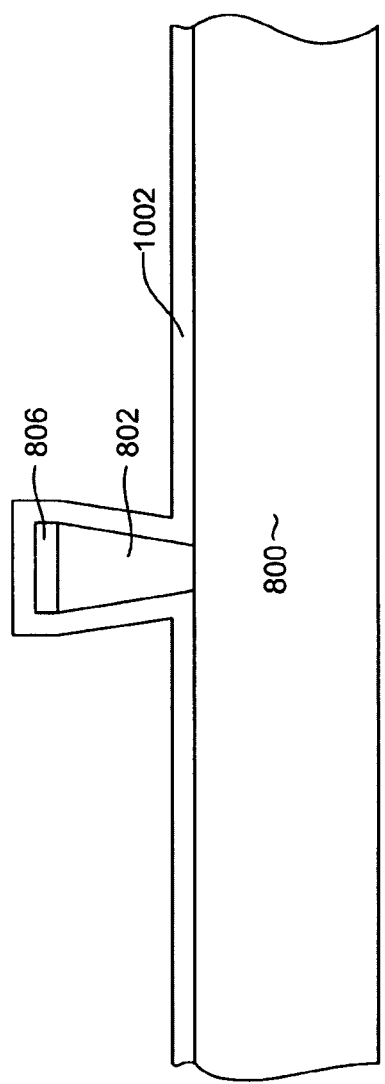
Figure 11:
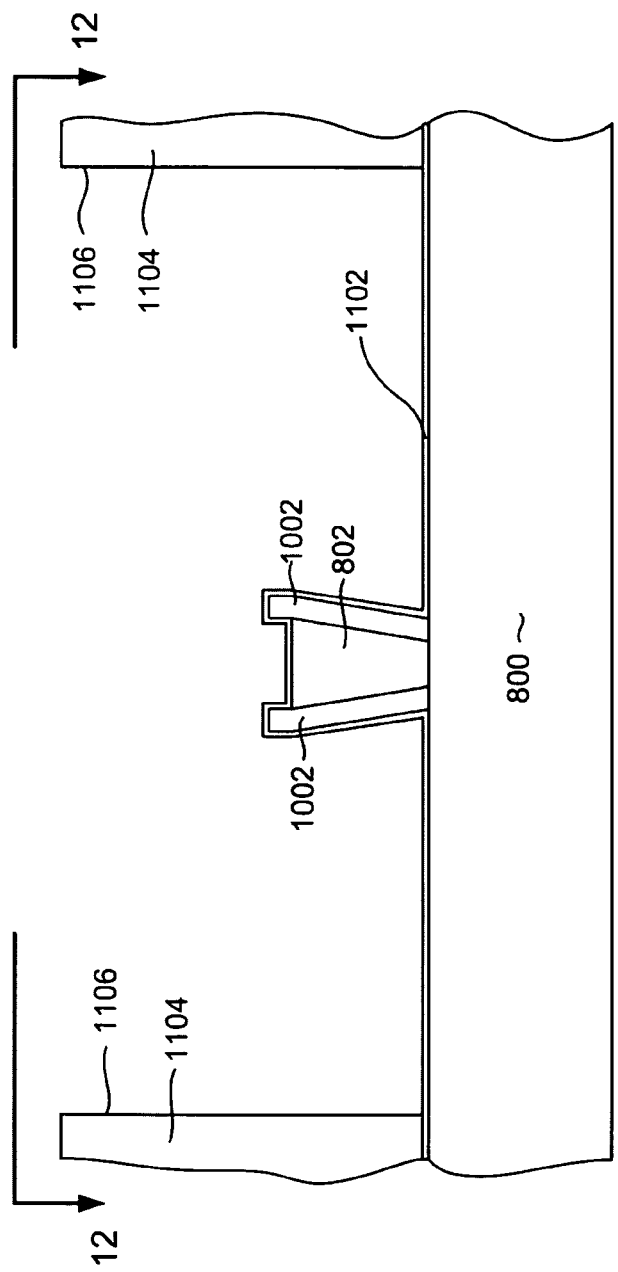
Figure 12:
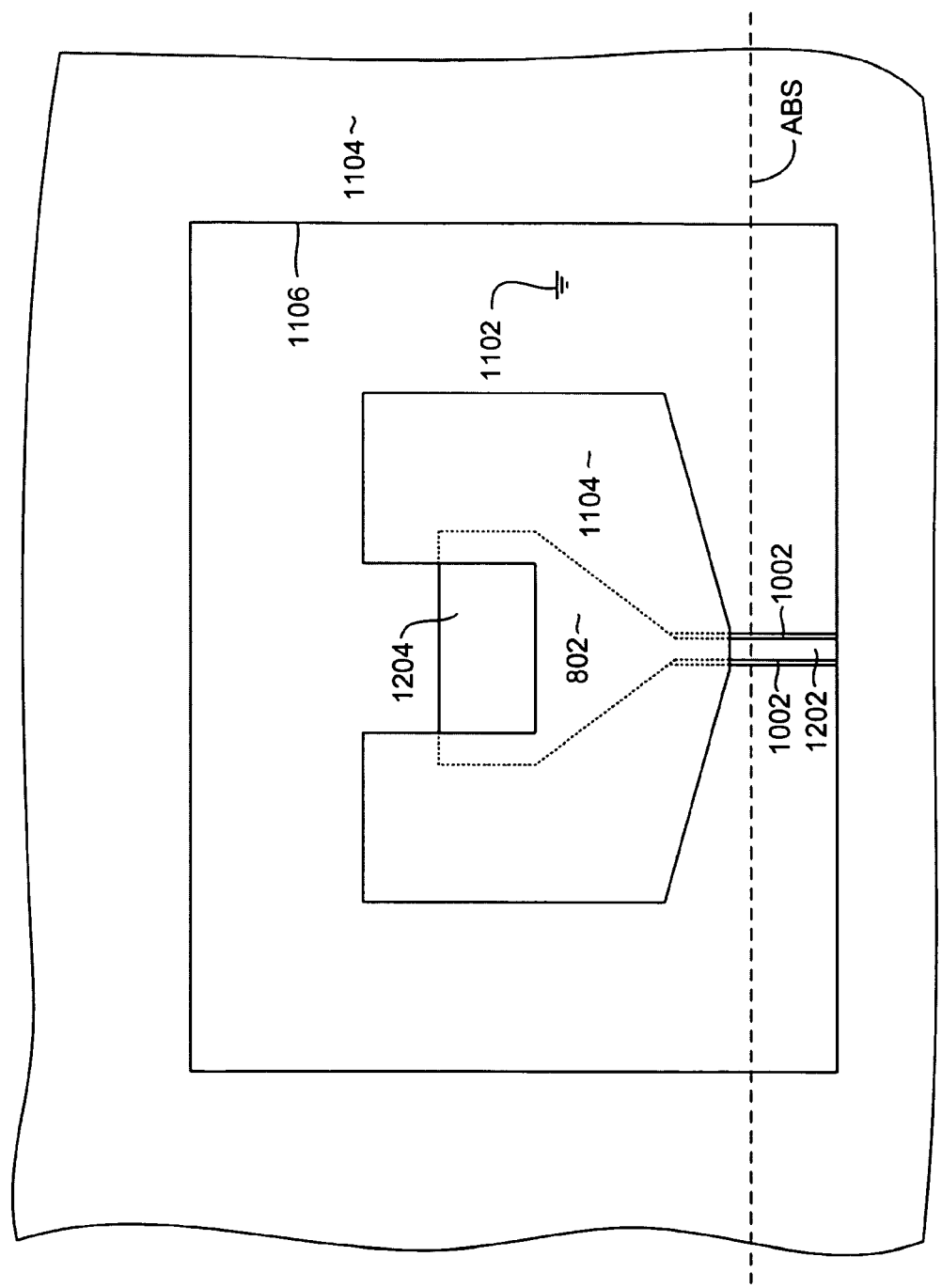

With reference to FIG. 10, a layer of non-magnetic side gap material 1002 is deposited. The non-magnetic side gap layer 1002 can be a material such as alumina, preferably deposited by a conformal deposition method such as atomic layer deposition, or chemical vapor deposition, and is deposited to a thickness to define non-magnetic side walls. A material removal process such as reactive ion etching (RIE) is then performed to preferentially remove horizontally disposed portions of the non-magnetic layer 1002 to form non-magnetic side walls 1002 as shown in FIG. 11. A Reactive Ion Etching (RIE) can also be performed to remove the remaining hard mask 806.

A non-magnetic, electrically conductive seed layer 1102 is then deposited to a thickness to define a trailing gap layer. The non-magnetic seed layer 1102 can be a material such as Rh. An electroplating frame mask 1104 is then formed over the seed layer 1102. The mask 1104, can be formed of photoresist, and can be photolithographically patterned and developed to have an opening 1106 that is configured to define a trailing, wrap-around shield. The opening 1106 can be seen more clearly in FIG. 12, which shows a top down view as taken from line 12-12 of FIG. 11. Portions of the write pole 802 and side walls 1002 that extend under the mask structure 1104 are shown in dotted line in FIG. 12.

At this point, it should be pointed out that the write pole 802 has a pole tip portion 1202 that extends beyond an air bearing surface plane that is indicated by dashed line denoted "ABS", and also has a back portion 1204 that is located away from the ABS plane. The previously deposited non-magnetic seed layer 1102 is deposited in a manner such that it covers the pole tip portion 1202, leaving the back portion 1204 uncovered. A magnetic seed layer (not shown) can be deposited over the back portion of 1204 of the write pole 802.

Figure 13:
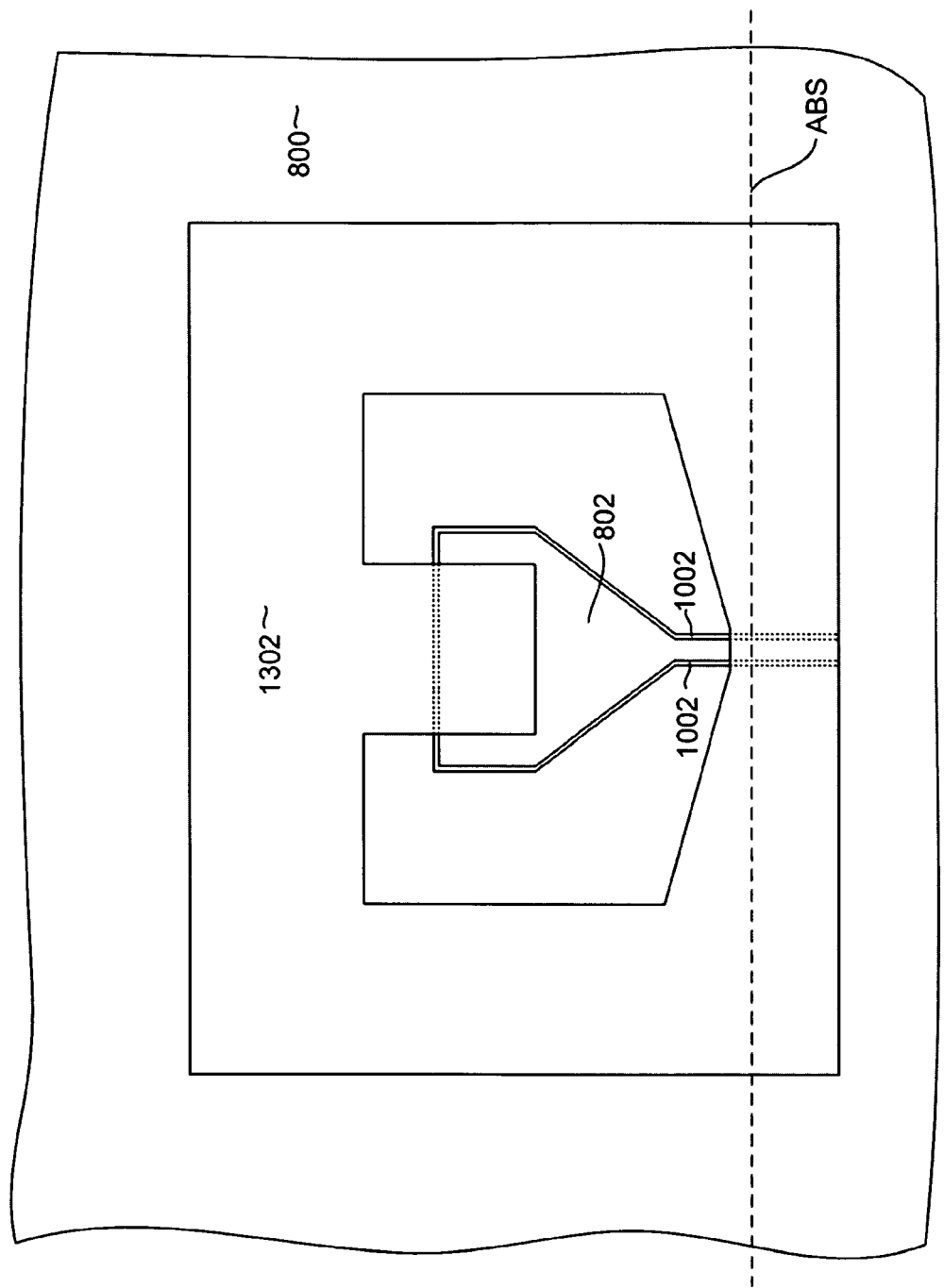

An electrically conductive, magnetic material such as Ni—Fe or CoFe can then be electroplated into the opening 1106 in the mask 1104. The mask 1104, can then be lifted off, leaving a structure as shown in FIG. 13, with a yoke 1302 that is formed over the write pole 802. The yoke 1302 is magnetically connected with the back portion 1204 of the write pole 802, but is separated from the pole tip portion 1202 by the non-magnetic seed layer 1102 and non-magnetic side gap layers 1002. After forming the yoke 1302, any unwanted seed layer extending beyond the yoke 1302 can be removed by ion milling or reactive ion etching, revealing the substrate 800.

It should be pointed out that, while the yoke 1302 has been described above as being electroplated into a frame plating mask, the yoke 1302 could also be formed by other methods. For example, a magnetic material could be deposited full film, such as by sputter deposition of a blanket film. A mask can then be formed over the magnetic material, the mask being configured to define the yoke 1302. Then, a material removal process such as ion milling, reactive ion etching, or wet chemical etching could be performed to remove portions of the magnetic material that are not protected by the mask to, thereby, form the yoke 1302.

It can be seen that by building the yoke 1302 flat in a plane that is perpendicular to the data track direction, DT, (and in the plane of the substrate surface 328 shown in FIG. 3) all or a portion of the yoke 1302 can be formed in a single electroplating step, rather than in a series of many lithographic patterning and plating steps, as would be the case with a prior art design wherein the yoke is built up as a series of several plated structures. This greatly simplifies manufacture, greatly decreasing manufacturing time and cost.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
   a substrate having a surface;
   a magnetic yoke formed as a single, integral layer along a plane that is substantially parallel with the substrate surface; and
   a magnetic write pole connected with the magnetic yoke, the magnetic write pole being configured for perpendicular magnetic recording and having an end that extends to an air bearing surface and having a trailing edge and a leading edge, the trailing edge being wider than the leading edge as viewed from the air bearing surface;
   wherein a portion of the magnetic yoke passes over the trailing edge to provide a trailing magnetic shield and being separated from the trailing edge of the write pole by a non-magnetic trailing gap layer; and
   wherein the magnetic yoke further comprises first and second laterally opposed magnetic return poles each having an end extending to the air bearing surface and a flux guide portion disposed between the first and second return poles, the flux guide portion terminating short of the air bearing surface and being magnetically connected with the magnetic write pole.

2. A magnetic write head as in claim 1 wherein the magnetic yoke further comprises first and second magnetic shield portions connected with each of the first and second return poles at the air bearing surface and extending toward the write pole.

3. A magnetic write head as in claim 2, wherein the first and second magnetic shield portions are each separated from the write pole by a non-magnetic gap layer.

4. A magnetic write head as in claim 1 wherein the magnetic yoke further comprises a magnetic wrap around shield portion connected with the first and second return poles, the magnetic shield portion being formed at the air bearing surface and having first and second side portions that are separated from first and second sides and a second sides of the write pole by a first and a second non-magnetic side gap layer.

5. A magnetic write head as in claim 1 wherein the shield extends from the first return pole to the second return pole.

6. A magnetic write head as in claim 1 further comprising a read head, and a magnetic shield disposed between the read head and the write pole.

* * * * *